Patented Sept. 11, 1951

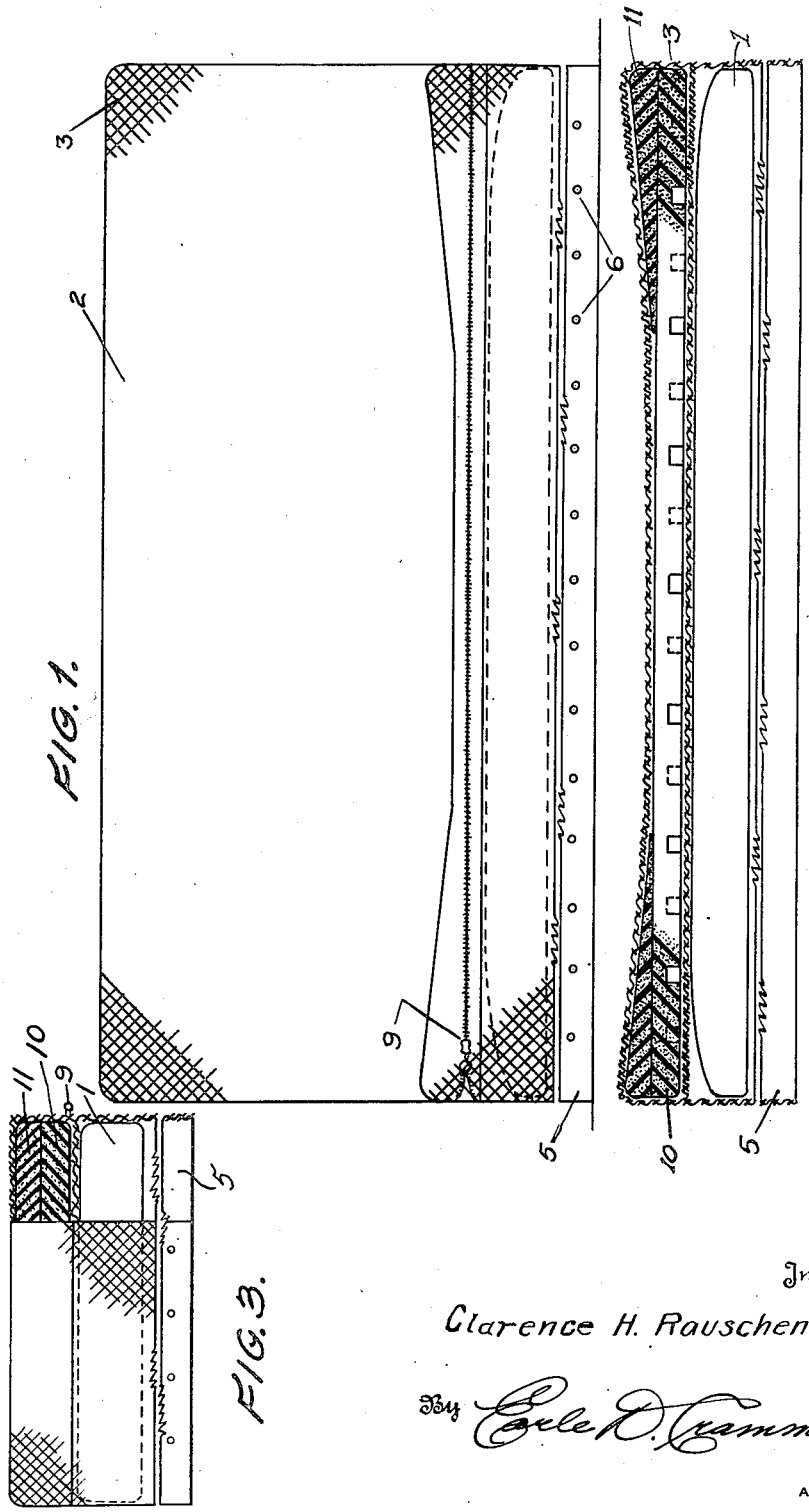

2,567,402

UNITED STATES PATENT OFFICE 2,567,402

SEAT COVER AND CUSHION

Clarence H. Rauschenberg, Washington, D. C.

Application August 16, 1948, Serial No. 44,504

4 Claims. (Cl. 155—182)

This invention relates to a seat cover and a supplementary seat cushion. More particularly it relates to a corrective seat cushion and seat cover for upholstered vehicle seats.

In the manufacture of spring cushions for seats and back rests, especially those used in motor vehicles, it is the practice to provide a crowned upholstered surface and in the fabrication the padding and covering is drawn down over the edges so as to produce a downwardly curved surface at edges which is below the plane of the intermediate seat portion. In a seat designed for occupancy by more than one person, such as are employed in motor vehicles for example, there results at the ends of the seat a downwardly sloping or thinner portion which does not provide for proper seating posture, and, in fact, provides a supporting surface which tends to make the occupant lean against the side of the seat or vehicle, as the case may be. It is an ordinary practice to provide covers for such seats but these are mere protective coverings which are not corrective of seat faults.

It is an object of this invention to provide a corrective cushion and combined seat cover which will provide uniformity of seat surface and back surface to the extreme end portions of the seat.

It is a further object of the invention to provide a seat cover with provisions for enclosing therein a detachable corrective cushion.

Other objects and advantages of the invention will become apparent from the following specification, and from reference to the drawing forming a part thereof wherein—

Figure 1 is a front view in elevation of a vehicle seat with the combined seat cover and corrective cushion applied thereto, the projection of the seat cover apron being broken for space conservation.

Fig. 2 is a view partly in section of the seat cover and cushion of Fig. 1.

Fig. 3 is an end view partly in section of the seat of Fig. 1.

In the drawing, 1 is a conventional upholstered spring seat of a motor vehicle having a back portion 2, the seat and back portion being covered by the combined seat cover 3 and auxiliary cushion 4 of the invention. The vehicle seat as illustrated is of the common type with edge portions at the ends of the seat curving downwardly, thus producing an abnormal seating surface at these end points.

The seat cover and cushion of the invention is arranged to be corrective of the abnormal end seating surfaces. The cover 3 is made of any suitable fabric or combinations of fabric and may be fabricated in a combined back and seat structure or it may constitute separate back and seat portions. In any event, the back and seat portions are tailored to size and conformity to fit the portions of the seat with the back portion of the cover being made to envelope, in whole or in part, the back portion of the seat, and the seat bottom portion of the cover being made to enclose the seat bottom and front thereof, a projecting apron 5 being provided for covering lower front portions of the seat. The apron 5 may be fastened as by buttons 6 along lower edges thereof to hold the cover down.

The seat cover structure described to this point does not depart from conventional structures. However, the structure departs from the conventional in the portions thereof overlying the seating surfaces. Here, the seat cover comprises a transverse lower horizontal fabric 7 and a spaced upper fabric 8 spaced therefrom to form a pocket or envelope with the front edge portions of the lower and upper fabrics being provided with fastening means such as a slide fastener 9 whereby the pocket or envelope may be opened to remove cushion 4, or be closed so as to envelope the cushion.

Auxiliary cushion 4 consists of a sheet 10 of sponge rubber or the like of uniform thickness and of the same overall dimensions as the seat. This sheet is provided in its lower surface with spaced recesses or air cells. At its end portions, corresponding to the portions of the main seat at its ends where the downwardly curved surface exists, the sponge rubber cushion is provided transversely of the ends with wedge shaped sponge rubber additions 11 which may be formed integral with the cushion sheet or may be formed of laminations suitably fixed to the end of the sheet.

The cushion structure described results in sealing surface which is normally in a horizontal plane at its intermediate portion but is upwardly sloping at its ends so that when it is occupied the end portions are depressed substantially to the plane of the intermediate portion to fill in the space resulting from the downwardly curved and thinner end portions of the main seat. This results in a correction of the seating surface so that an occupant is able to sit in normal posture without tending to lean against a side support.

The cushion 4 is insertable and removable from the envelope of the cover, access thereto being had by the opening afforded in the cover and adapted to be opened or closed by the slide fastener 9. The characteristic of the foam rubber bearing surface is such as to prevent slippage of the cover with respect to the cushion. It will be seen that the combined cushion and cover provides protection and a corrective seat appliance.

Having illustrated and described the invention in compliance with statutory requirements, I claim:

1. A detachable cover for a vehicle seat comprising, a fabric cover for said seat, said cover having a pocket therein substantially coextensive with the upper surface of the seat, an auxiliary seat and a cushion adapted for insertion in the pocket of said cover, said auxiliary cushion having end portions of greater thickness than the intermediate portion.

2. A detachable seat cover for a vehicle seat comprising, a fitted flexible cover for the seat having an envelope portion coextensive with the upper surface of the seat to be covered, and a removable cushion insert in said envelope having opposite end portions thereof of gradually increasing thickness outwardly to ends of the cushion.

3. A detachable seat cover for a vehicle seat comprising, a fitted flexible cover for the seat having an envelope portion coextensive with the upper surface of the seat to be covered, and a removable cushion insert in said envelope, said insert being provided with wedge shaped pieces transversely the end thereof to provide an upwardly sloping surface at each end of the cushion insert.

4. A detachable seat cover for a vehicle seat comprising, a fitted flexible cover for the seat having an envelope portion coextensive with the upper surface of the seat to be covered, a slide fastener for opening and closing said envelope portion, and a removable cushion insert in said envelope having opposite end portions thereof of gradually increasing thickness outwardly to ends of the cushion.

CLARENCE H. RAUSCHENBERG.

REFERENCES CITED

The following references are of record in the file of this patent:

UNITED STATES PATENTS

| Number | Name | Date |
|---|---|---|
| 1,673,433 | Wheeler et al. | June 12, 1928 |
| 2,228,948 | Field | Jan. 14, 1941 |
| 2,229,536 | Wilkich | Jan. 21, 1941 |

FOREIGN PATENTS

| Number | Country | Date |
|---|---|---|
| 782,695 | France | Dec. 13, 1934 |